United States Patent
Yang et al.

(10) Patent No.: US 10,630,659 B2
(45) Date of Patent: Apr. 21, 2020

(54) SCALABLE SECURITY KEY ARCHITECTURE FOR NETWORK ENCRYPTION

(71) Applicant: Nicira, Inc., Palo Alto, CA (US)

(72) Inventors: Jinqiang Yang, Santa Clara, CA (US); Ganesan Chandrashekhar, Campbell, CA (US); Bin Qian, San Jose, CA (US); Amit Chopra, Mountain View, CA (US); Sanal Pillai, Sunnyvale, CA (US)

(73) Assignee: Nicira, Inc., Palo Alto, CA (US)

( * ) Notice: Subject to any disclaimer, the term of this patent is extended or adjusted under 35 U.S.C. 154(b) by 410 days.

(21) Appl. No.: 15/281,726

(22) Filed: Sep. 30, 2016

(65) Prior Publication Data

US 2018/0097785 A1    Apr. 5, 2018

(51) Int. Cl.
*H04L 29/06* (2006.01)
*H04L 12/46* (2006.01)
*H04L 29/08* (2006.01)

(52) U.S. Cl.
CPC ........ *H04L 63/061* (2013.01); *H04L 12/4633* (2013.01); *H04L 63/0272* (2013.01); *H04L 63/0281* (2013.01); *H04L 63/062* (2013.01); *H04L 63/065* (2013.01); *H04L 67/146* (2013.01); *H04L 63/166* (2013.01)

(58) Field of Classification Search
CPC ..... H04L 9/0825; H04L 9/083; H04L 9/0891; H04L 63/061; H04L 63/0281; H04L 63/0272; H04L 63/062; H04L 63/065; H04L 63/166; H04L 12/4633

USPC ............................................ 713/154; 726/15
See application file for complete search history.

(56) References Cited

U.S. PATENT DOCUMENTS

| | | | | |
|---|---|---|---|---|
| 10,085,148 | B2 * | 9/2018 | Vanderveen | H04L 9/083 |
| 2004/0059913 | A1 * | 3/2004 | de Jong | G06F 21/10 713/165 |
| 2006/0240802 | A1 * | 10/2006 | Venkitaraman | H04L 63/067 455/411 |
| 2008/0016338 | A1 * | 1/2008 | Sun | H04L 63/0428 713/163 |
| 2010/0290627 | A1 * | 11/2010 | Tsuji | H04L 9/0825 380/282 |
| 2013/0311777 | A1 * | 11/2013 | Kolar Sundar | H04L 9/083 713/168 |

(Continued)

*Primary Examiner* — Samson B Lemma
(74) *Attorney, Agent, or Firm* — Patterson + Sheridan, LLP (57) ABSTRACT

An example method of key management for encryption of traffic in a network having a network nodes includes negotiating, between a first network node and a centralized key management server, to obtain a master key shared among the network nodes; receiving, at the first network node, a first identifier for the first network node and a second identifier for a second network node; generating, at the first network node, a first session key by supplying the master key, the first identifier, and the second identifier as parametric input to a function; establishing, using a network stack of the first network node, a first point-to-point tunnel through the network to the second network node without a key exchange protocol; and sending first traffic from the first network node to the second network node through the first point-to-point tunnel, the first traffic including a portion encrypted by the first session key.

18 Claims, 7 Drawing Sheets

(56) References Cited

U.S. PATENT DOCUMENTS

2015/0104017 A1* 4/2015 Halford ................ H04W 12/04
                                                        380/270
2016/0020968 A1* 1/2016 Aumann ............... H04L 43/062
                                                        370/252

* cited by examiner

SCALABLE SECURITY KEY ARCHITECTURE FOR NETWORK ENCRYPTION

BACKGROUND

Computer virtualization is a technique that involves encapsulating a physical computing machine platform into virtual machine(s) executing under control of virtualization software on a hardware computing platform or "host." A virtual machine provides virtual hardware abstractions for processor, memory, storage, and the like to a guest operating system. The virtualization software, also referred to as a "hypervisor," includes one or more virtual machine monitors (VMMs) to manage the virtual machine(s). Each virtual machine supports the execution of a guest operating system (OS) and software on top of the guest OS.

Computer virtualization is used within data centers to provide software-defined compute resources. Other typically hardened infrastructures can be virtualized in a data center, including networking infrastructure. Network virtualization encapsulates physical network hardware into virtualized networks controlled by virtualization software on a hardware computing platform. A virtualized network provides software containers that implement logical network components, such as switches, routers, firewalls, load balancers, virtual private networks (VPNs), and the like. Virtualized networks can employ distributed network encryption (DNE) to encrypt network traffic between distributed logical network components. A DNE service can be implemented using VPNs.

VPNs are often used to securely share data between network nodes over a public network, such as the Internet. VPNs encapsulate data communications, such as Internet Protocol (IP) packets, between nodes via the public network. A traditional VPN employs a point-to-point key negotiation between nodes to establish a tunnel (referred to herein as a "session"). For each session, the nodes establish a security association (SA) that defines the rules to use for authentication and encryption algorithms, key exchange mechanisms, and secure communications. However, key management for traditional VPNs is not scalable and becomes burdensome in large networks due to the increasing number of SAs between nodes. Virtualized networks can include a large number of logical network components, making the implementation of DNE services using traditional VPNs too complex and burdensome.

DETAILED DESCRIPTION

Techniques for providing a scalable key architecture for network encryption are described. The scalable key architecture described herein achieves the benefits of key management in a group virtual private network (VPN) solution, while providing improvements that enable better anti-replay checking and interoperation with network nodes that do not support group VPN. A "group VPN" is a VPN deployment that does not use point-to-point key negotiations between network nodes in contrast to traditional VPN deployments, such as Internet Protocol Security (IPSec) deployments. Instead, in group VPN, a key server distributes keys and policies to member nodes of the group. The member nodes encrypt and decrypt traffic using the distributed keys. The shared keys enabled each member node to decrypt packets encrypted by any of the other member nodes.

Detecting and dropping replayed packets (referred to as "anti-replay checking") is an important security function for VPN solutions. Without anti-replay checking, the VPN solution does not provide protection against packet replay attacks. For example, an attacker may attempt to replay a packet that causes a transfer of a certain amount of money from one account to another account. Even though the packet is encrypted and authenticated, the receiving node needs to detect and drop the subsequent replays of the original packet. In traditional VPN solutions, such as IPSec, anti-replay protection is achieved through the use of sequence numbers associated with a given point-to-point tunnel between two nodes (also referred to as a "session"). A receiving node accepts a given packet with a given sequence number only once and drops any subsequent packets with the same sequence number.

The use of sequence numbers for anti-replay checking is not effective in group VPN deployments, as group VPN lacks sessions between the member nodes that would otherwise provide context for the sequence numbers. One solution for anti-replay checking in group VPN deployments is to implement time windows. In this solution, the key server and the member nodes have synchronized clocks. The sending members stamp the packets with a current time, and each receiving member maintains a time window. If the incoming packet falls inside this time window, the receiving node accepts the packet. Otherwise, the receiving node rejects the packet. However, this solution only provides loose anti-replay protection, as replayed packets that fall inside the time window would be accepted.

The VPN solution described herein implements a two-tier key architecture. The top tier can be any scalable master key management technique, such as that employed in group VPN. However, the master key is not used for traffic encryption directly. The bottom tier provides for generation of session keys locally at each network node and is fully scalable. The network nodes derive the session keys from the master key in a manner that is independent from the master key management technique. The network nodes use the session keys to encrypt traffic through point-to-point tunnels. Unlike traditional VPN, the network nodes do not use a key exchange protocol when setting up point-to-point tunnels. Unlike group VPN deployments, the network nodes can use sequence number-based anti-replay checking, which is more secure than the time-window based checking described above. Further, the VPN solution described herein allows for seamless inter-operation between network nodes regardless of whether they support group VPN or traditional VPN, such as IPSec. These and further aspects are described below with respect to the drawings.

Figure 1:
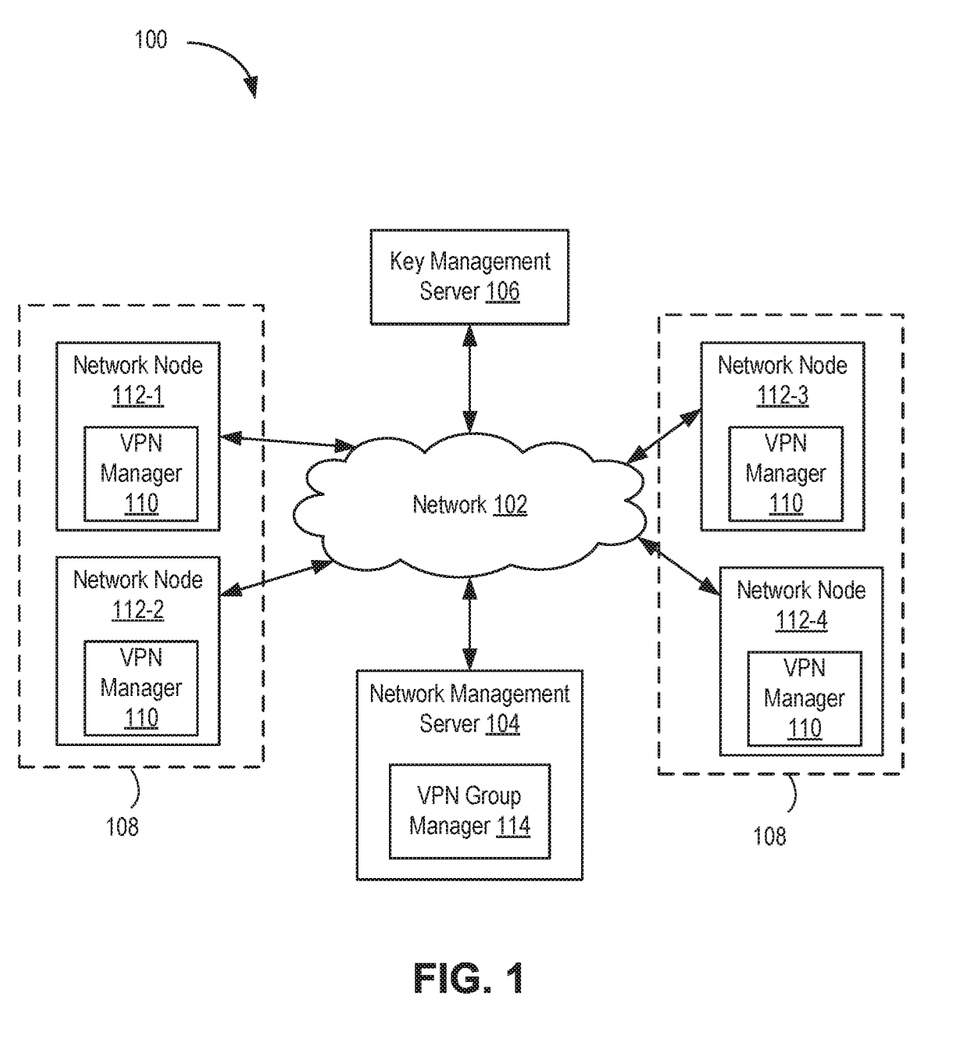
FIG. 1 is a block diagram depicting a network system according to an embodiment.

FIG. 1 is a block diagram depicting a network system 100 according to an embodiment. Network system 100 includes a plurality of network nodes 112 coupled to a network 102. By way of example, FIG. 1 shows four network nodes 112-1 through 112-4, although network system 100 can have more or less than four network nodes 112. Network system 100 further includes a key management server 106 and a network management server 104. In another embodiment, the functions of key management server 106 and network management server 104 can be performed by a single server.

Network management server 104 can be constructed on a server grade hardware platform, such as an x86 architecture platform, ARM® architecture platform, or the like. An administrator interacts with network management server 104 to configure network encryption for network system 100. Network management server 104 implements network encryption using a VPN solution having a scalable, two-tier key management architecture. The top tier is master key management infrastructure that is fully scalable and includes a centralized key manager. The bottom tier is a session key infrastructure that derives session keys from the master key in a manner that is independent of the master key management mechanism. Session keys are used to encrypt traffic between nodes through point-to-point tunnels.

In an embodiment, network management server 104 includes VPN group manager 114. VPN group manager 114 is software executed by network management server 104 to perform various functions described herein. An administrator interacts with VPN group manager 114 to create one or more security groups of network nodes 112. In the example of FIG. 1, network nodes 112-1 through 112-4 are part of a security group 108. Although only one security group is shown in FIG. 1, network system 100 can include more than one security group. In response to establishing security group 108, VPN group manager 114 requests key management server 106 to generate a master key for security group 108. The master key is any information that can be used to determine the output of a cryptographic algorithm. For example, the master key can be an alphanumeric string. In an embodiment, VPN group manager 114 assigns a group identifier for each security group, and key management server 106 maintains a set of master keys associated with different security groups based on group identifiers.

VPN group manager 114 and/or key management server 106 can also generate security context information for security group 108. The security context information can include an encryption algorithm to be used by the security group, an authentication algorithm to be used by the security group, VPN protocol(s) to be used by the security group, and the like. VPN group manager 114 and/or key management server 106 also generates globally unique identifiers (GUIDs) for each network node 112-1 through 112-4 in security group 108. In general, the GUIDs uniquely identify the network nodes in a given security group.

VPN group manager 114 provisions a VPN manager 110 to each of network nodes 112-1 through 112-4 in security group 108. VPN manager 110 is software executed by a network node to implement functions described herein. In general, each network node 112 can be any type of computing device, such as a computer or server, mobile device, network appliance (e.g., router, gateway, switch, etc.), and the like. VPN manager 110 is configured to interact with key management server 106 to obtain the master key for security group 108. VPN manager 110 also interacts with VPN group manager 114 and/or key management server 106 to obtain security context information for security group 108 and GUIDs for network nodes 112-1 through 112-4.

VPN managers 110 implement the bottom tier of the two-tier key management architecture. Each VPN manager 110 generates a session key as a function of the master key, the GUID of a source network node, and the GUID of a destination network node. VPN managers 110 cooperate with network stacks to establish point-to-point tunnels between source and destination nodes. VPN managers 110 provide the session keys to the network stacks, obviating the need for a key exchange protocol, such as Internet Key Exchange (IKE). A key exchange protocol is not necessary, since each end of the tunnel can generate the same session key from the master key, the source GUID, and the destination GUID. Further, since unique sessions are established between source and destination network nodes, sequence number-based anti-replay checking can be used. In addition, the two-tier key management architecture does not require the network stacks of the network nodes to support group VPN.

Figure 2:
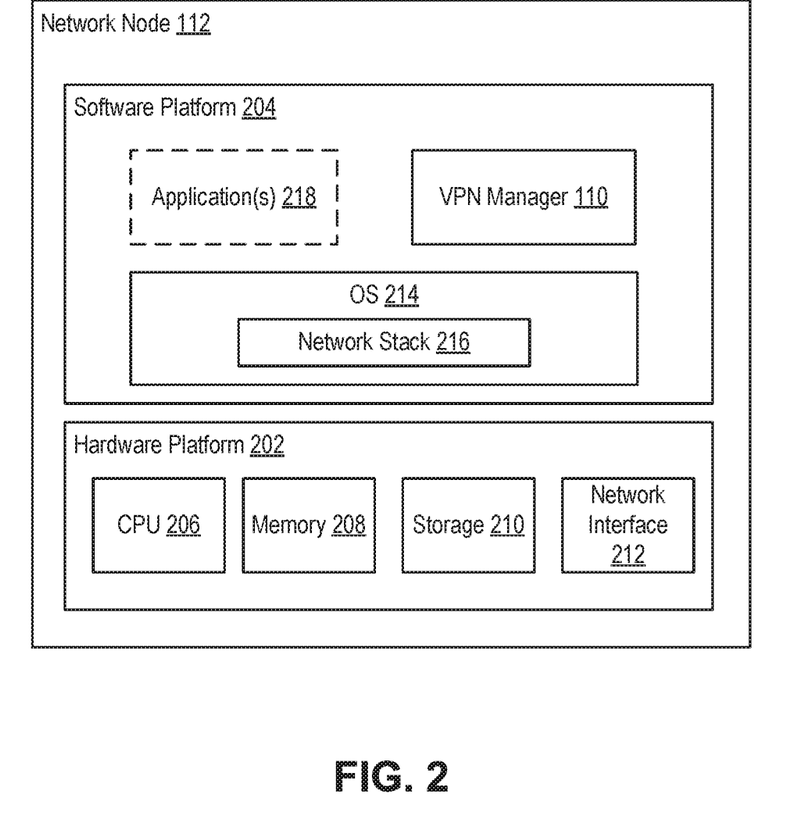
FIG. 2 is a block diagram of a network node according to an embodiment.

FIG. 2 is a block diagram of a network node 112 according to an embodiment. Network node 112 includes a software platform 204 executing on a hardware platform 202. Hardware platform 202 includes a central processing units (CPU) 206, system memory 208 (also referred to as "memory 108"), storage 210, and a network interface 212. CPU 206 is configured to execute instructions, for example, executable instructions that perform one or more operations described herein. Such executable instructions can be stored in memory 208 and/or in storage 210. Memory 208 includes devices allowing information, such as executable instructions and data, to be stored and retrieved. Memory 208 may include, for example, one or more random access memory (RAM) modules. Network interface 212 enables network node 112 to interface with network 102. Storage 210 includes local storage devices (e.g., one or more hard disks, flash memory modules, solid state disks, and optical disks) and/or storage interfaces to network data storage systems (not shown). Example network data storage systems include storage area networks (SANs), a network-attached storage (NAS), and the like. Hardware platform 202 is just one example hardware platform that can be used in embodiments described herein. In general, any hardware platform that includes at least a CPU and memory can be employed.

Software platform 204 includes an operating system (OS) 214 and VPN manager 110. In an embodiment, software platform 204 also includes one or more applications 218. OS 214 executes on hardware platform 202 and provides an interface to hardware platform for VPN manager 110 and applications 218. OS 214 can be any commodity operating system known in the art, such as Linux®, Microsoft Windows®, Mac OS®, or the like. VPN manager 110 comprises software, executable by CPU 206, to perform functions described herein. In particular, as described above, VPN manager 110 is configured to interact with key management server 106 to obtain a master key associated with a security group. VPN manager 110 is configured to interact with key management server 106 and/or network management server 104 to obtain security context information and GUIDs of network nodes in the security group. VPN manager 110 is further configured to interact with network stack 216 in OS 214 to establish point-to-point tunnels with destination network nodes through network 102. VPN manager 110 generates the session keys for the sessions, and provides the session keys and associated security context information to network stack 216 to establish the sessions.

Network stack 216 implements various network protocols for OS 214, including Transmission Control Protocol (TCP), Internet Protocol (IP), and the like. In an embodiment, network stack 216 implements IPSec or a similar protocol for providing traditional VPN services. In an embodiment, network stack 216 also supports a group VPN protocol. Regardless of the VPN protocol used, network stack 216 is configured by VPN manager 110. In particular, VPN manager 110 provides session keys and security context information to network stack 216 to establish sessions with other network nodes in the group.

Application(s) 218 can send and receive traffic through network stack 216, which is encrypted and authenticated based on the session keys and the security context information. Alternatively, network node 112 can be a network appliance, such as a gateway, which sends and receives clear traffic to and from other node(s) on a private network (not shown). In such case, network node 112 can establish VPNs are described herein and encrypt the traffic on behalf of the other node(s).

Figure 3:
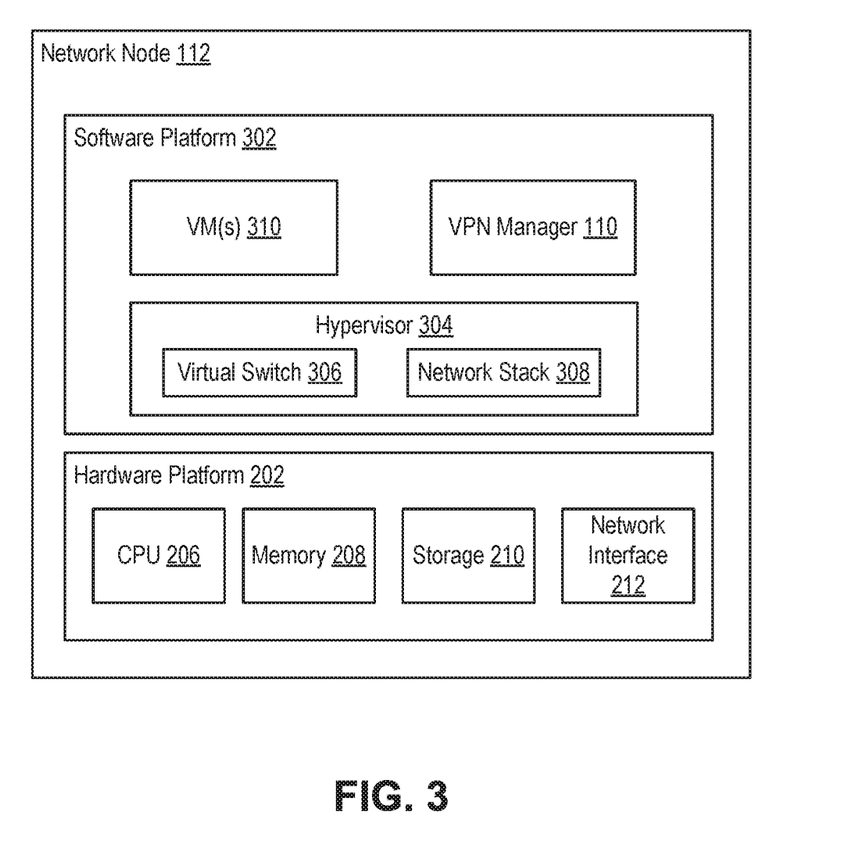
FIG. 3 is a block diagram of a network node according to another embodiment.

FIG. 3 is a block diagram of a network node 112 according to another embodiment. Elements of FIG. 3 that are the same or similar to those of FIG. 2 are designated with identical reference numerals and are described in detail above. In the present embodiment, network node 112 includes hardware platform 202 and a software platform 302. Software platform 302 includes a hypervisor 304 in place of OS 214. Hypervisor 304 comprises all or a portion of virtualization software that abstracts processor, memory, storage, and networking resources of hardware platform 202 into multiple virtual machines (VMs) 310 that run concurrently on network node 112. VMs 310 run on top of hypervisor 304, which implements platform virtualization and enables sharing of the hardware resources of network node 112 by VMs 310. One example of hypervisor 304 that may be configured and used in embodiments described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized consistent with the teachings herein). Each VM 310 supports execution of a guest OS and various applications.

Hypervisor 304 includes a network stack 308 similar to network stack 216 of OS 214. Hypervisor 304 also includes a virtual switch 306 that provides an interface between VMs 310 and network stack 308. VPN manager 110 executes in hypervisor 304 and performs the various functions described above to obtain a master key, generate session keys, and configured network stack 308 to establish point-to-point tunnels with other network nodes in the security group.

Figure 4:
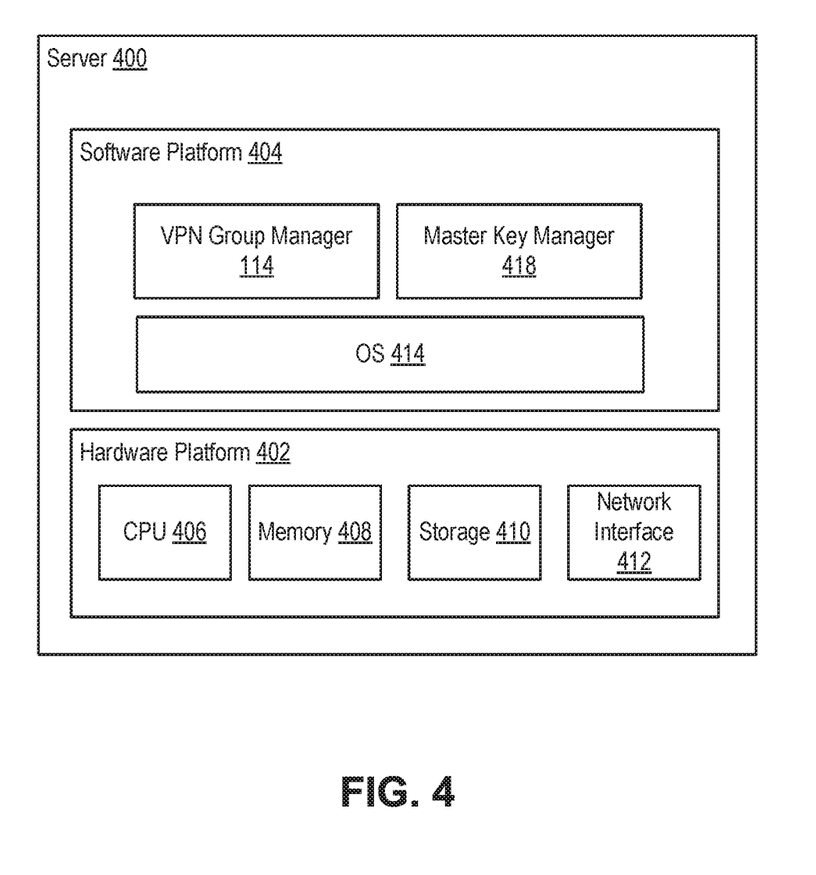
FIG. 4 is a block diagram of a server according to an embodiment.

FIG. 4 is a block diagram of a server 400 according to an embodiment. Server 400 can be used to implement network management server 104, key management server 106, or both. Server 400 includes a software platform 404 executing on a hardware platform 402. Hardware platform 402 includes CPU 406, system memory 408, storage 410, and a network interface 412. CPU 406 is configured to execute instructions, for example, executable instructions that perform one or more operations described herein. Such executable instructions can be stored in memory 408 and/or in storage 410. Memory 408 includes devices allowing information, such as executable instructions and data, to be stored and retrieved. Memory 408 may include, for example, one or more RAM modules. Network interface 412 enables server 400 to interface with network 102. Storage 410 includes local storage devices (e.g., one or more hard disks, flash memory modules, solid state disks, and optical disks) and/or storage interfaces to network data storage systems (not shown). Hardware platform 402 is just one example hardware platform that can be used in embodiments described herein. In general, any hardware platform that includes at least a CPU and memory can be employed.

Software platform 404 includes an OS 414. Software platform 404 can include VPN group manager 114, master key manager 418, or both. OS 414 executes on hardware platform 402 and provides an interface to hardware platform for VPN group manager 114 and/or master key manager 418. OS 414 can be any commodity operating system known in the art, such as Linux®, Microsoft Windows®, Mac OS®, or the like. VPN group manager 114 comprises software, executable by CPU 406, to perform functions described herein. In particular, as described above, VPN group manager 114 is configured to create security groups, interact with master key manager 418 to generate master keys, generate and distribute GUIDs, and generate and distribute security context information. Master key manager 418 comprises software, executable by CPU 406, to generate master keys for security groups, generate and distribute GUIDs, and generate and distribute security context information. While software platform 404 is described as including OS 414 executing on hardware platform 402, in other embodiments, software platform 404 can include a hypervisor executing on hardware platform 402 similar to the configuration shown in FIG. 3 above for network node 112. In such case, VPN group manager 114 and master key manager 418 can execute in the same or different VMs.

Figure 5:
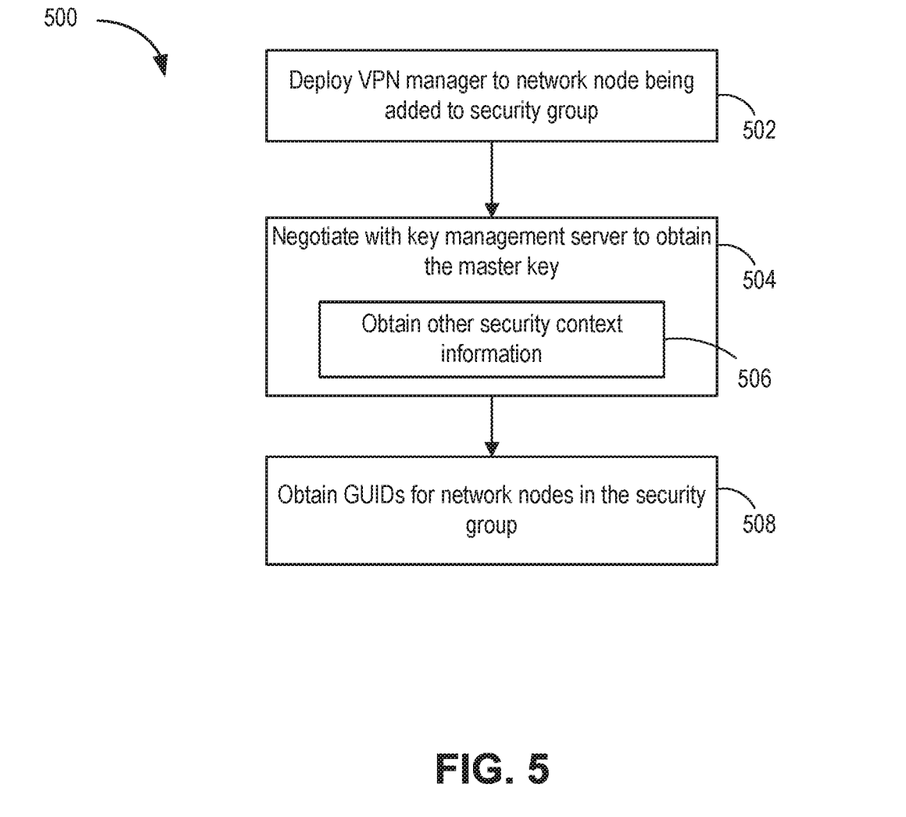
FIG. 5 is a flow diagram depicting a method of master key management according to an embodiment.

FIG. 5 is a flow diagram depicting a method 500 of master key management according to an embodiment. Method 500 can be performed by VPN group manager 114 and VPN manager 110 in a network node 112. Method 500 begins at step 502, where VPN group manager 114 deploys VPN manager 110 to the network node being added to the security group. At step 504, VPN manager 110 negotiates with key management server 106 to obtain the master key for the security group. In an embodiment, VPN manager 110 can negotiate with key management server 106 to obtain the master key using a key exchange protocol, such as IKE or the like.

In an embodiment, at step 506, VPN manager 110 obtains security context information for the security group. The security context information can include the type of encryption, the type of authentication, the protocols to be used, etc. In an embodiment, the security context information can include the function to be used to generate the session keys from the master key. The VPN manager 110 can obtain the security context information from the key management server 106 or from the VPN group manager 114. At step 508, VPN manager 110 obtains GUIDs for network nodes in the security group. VPN manager 110 can obtain the GUIDs from key management server 106 or from VPN group manager 114. Method 500 can be performed for each network node in the security group to deploy the master key. The master key is thus shared among all network nodes in the security group.

Figure 6:
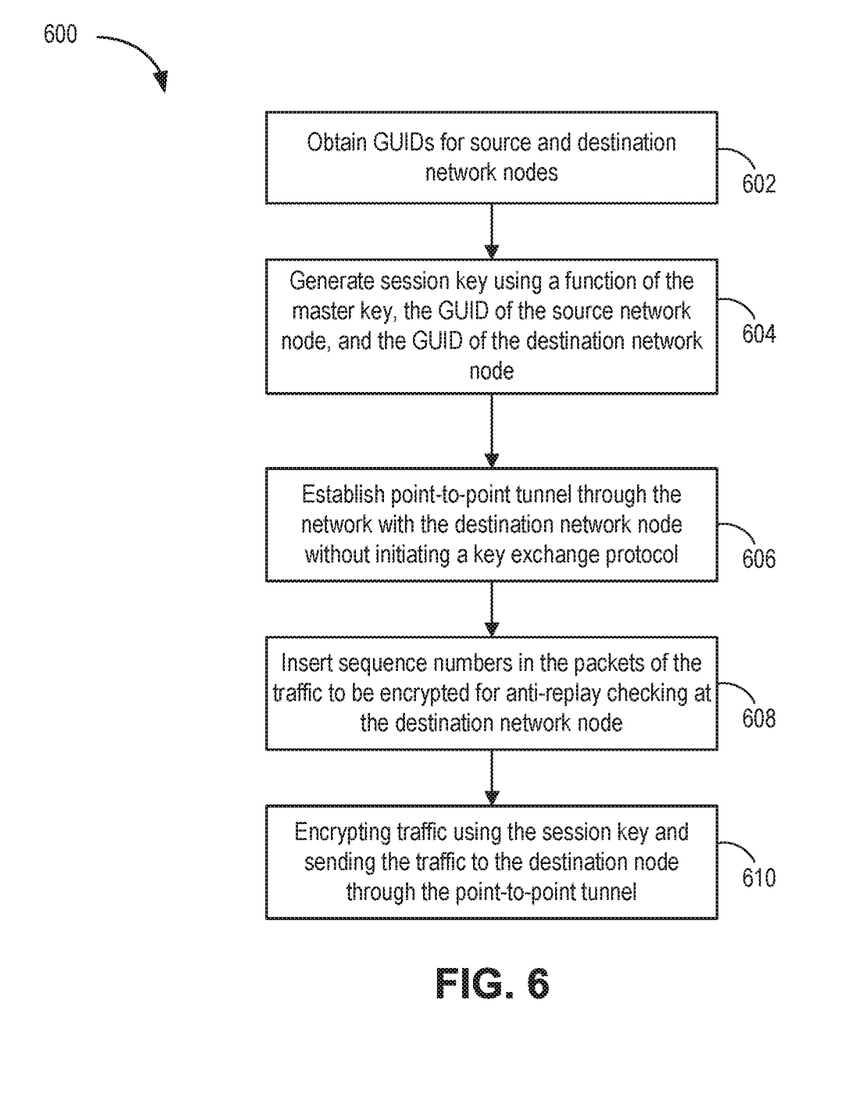
FIG. 6 is a flow diagram depicting a method of establishing a VPN session according to an embodiment.

FIG. 6 is a flow diagram depicting a method 600 of establishing a VPN session according to an embodiment. Steps of method 600 can be performed by VPN manager 110 disposed in a source network node. At step 602, VPN manager 110 obtains GUIDs for the source network node and the destination network node. VPN manager 110 can maintain a table that relates GUIDs to network nodes. VPN manager 110 can update the table based on information received from VPN group manager 114 and/or key management server 106.

At step 604, VPN manager 110 generates a session key using a function of the master key, the GUID of the source network node, and the GUID of the destination network node. The function can be any cryptographic function known in the art, such as a one-way hash function. The function used is known to each of the network nodes in the security group. In an embodiment, the function used to generate the session key can be provided in the security context information. The session key itself is any information that can be used to determine the output of a cryptographic algorithm used for encryption. For example, the session key can be an alphanumeric string. The session key is unique to the pair of the source and destination network nodes.

At step 606, VPN manager 110 cooperates with a network stack to establish a point-to-point tunnel through network 102 with the destination network node without initiating a key exchange protocol. Since the destination has the necessary information to generate the session key, there is no need to exchange keys between the source and destination network nodes. VPN manager 110 can provide the session key and security context information to the network stack for establishing the point-to-point tunnel. At step 608, the network stack inserts sequence numbers in the packets of traffic to be sent to the destination network node for anti-replay checking. At step 610, the network stack encrypts traffic using the session key and sends the encrypted traffic to the destination node through the point-to-point tunnel.

A source network node can repeat method 600 to establish multiple point-to-point tunnels with multiple destination nodes. The source network node uses a unique session key for each established point-to-point tunnel based on the different GUIDs of the destination network nodes.

Figure 7:
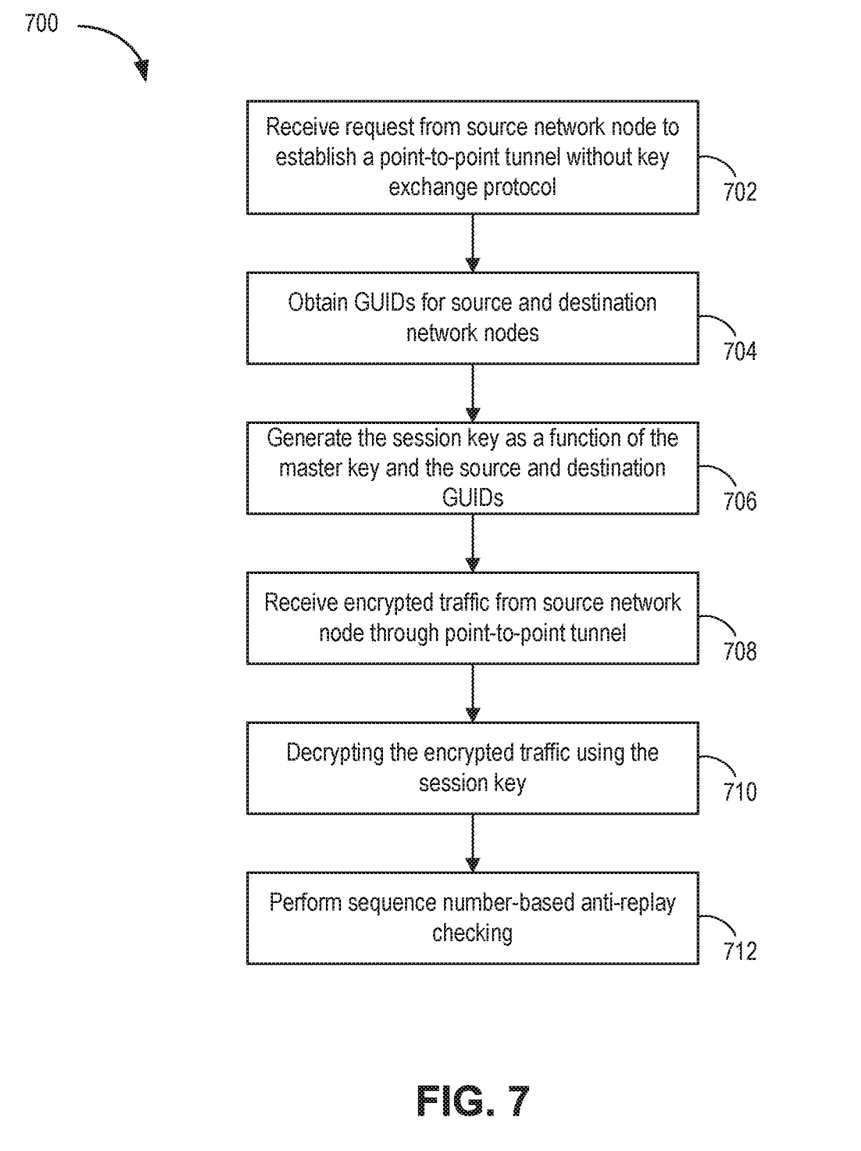
FIG. 7 is a flow diagram depicting a method of receiving encrypted traffic at a network node according to an embodiment.

FIG. 7 is a flow diagram depicting a method 700 of receiving encrypted traffic at a network node according to an embodiment. Method 700 can be performed by a network stack and VPN manager 110 in a destination network node. At step 702, the network stack receives a request from the source network node to establish a point-to-point tunnel without using a key exchange protocol. At step 704, VPN manager 110 obtains GUIDs for the source and network nodes. VPN manager 110 can maintain a table that relates GUIDs to network nodes. VPN manager 110 can update the table based on information received from VPN group manager 114 and/or key management server 106.

At step 706, VPN manager 110 generates the session key as a function of the master key, the source GUID, and the destination GUID. Thus, VPN manager 110 in the destination network node generates the same session key as VPN manager 110 in the source network node. At step 708, the network stack receives encrypted traffic from the source network node through the point-to-point tunnel. At step 710, the network stack decrypts the encrypted traffic using the session key. At step 712, the network stack performs anti-replay checking on the traffic based on sequence numbers in the packets. The network stack drops any packets that include repeat sequence numbers.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

We claim:

1. A method of key management for encryption of traffic in a network having a plurality of network nodes, the method comprising:

negotiating, between a first network node of the plurality of network nodes and a centralized key management server, to obtain a master key, the master key shared among the plurality of network nodes;

receiving, at the first network node, a first identifier for the first network node and other identifiers for other network nodes of the plurality of nodes;

generating, at the first network node, a plurality of session keys by supplying the master key, the first identifier, and the other identifiers as parametric input to a function;

establishing, using a network stack of the first network node, a plurality of point-to-point tunnels through the network to the other network nodes without a key exchange protocol; and sending traffic from the first network node to each of the other network nodes through each of the plurality of point-to-point tunnels, the traffic including a portion encrypted by a respective one of the plurality of session keys.

2. The method of claim 1, wherein the traffic for each of the plurality of point-to-point tunnels includes packets that have sequence numbers.

3. The method of claim 1, wherein each of the first identifier and the other identifiers is one of a plurality of globally unique identifiers assigned to the plurality of network nodes.

4. The method of claim 1, wherein the function is known to each of the plurality of nodes.

5. The method of claim 1, further comprising:
receiving, at the first network node, security context information for the plurality of point-to-point tunnels.

6. The method of claim 5, wherein the security context information includes at least one of: an encryption algorithm to be used, an authentication algorithm to be used, a protocol to be used, and a cryptographic function to be used as the function that generates the plurality of session keys.

7. A non-transitory computer readable medium comprising instructions, which when executed in a computer system, causes the computer system to carry out a method of key management for encryption of traffic in a network having a plurality of network nodes, the method comprising:
negotiating, between a first network node of the plurality of network nodes and a centralized key management server, to obtain a master key, the master key shared among the plurality of network nodes;

receiving, at the first network node, a first identifier for the first network node and other identifiers for other network nodes of the plurality of nodes;

generating, at the first network node, a plurality of session keys by supplying the master key, the first identifier, and the other identifiers as parametric input to a function;

establishing, using a network stack of the first network node, a plurality of point-to-point tunnels through the network to the other network nodes without a key exchange protocol; and sending traffic from the first network node to each of the other network nodes through each of the plurality of point-to-point tunnels, the traffic including a portion encrypted by a respective one of the plurality of session keys.

8. The non-transitory computer readable medium of claim 7, wherein the traffic for each of the plurality of point-to-point tunnels includes packets that have sequence numbers.

9. The non-transitory computer readable medium of claim 7, wherein each of the first identifier and the other identifiers is one of a plurality of globally unique identifiers assigned to the plurality of network nodes.

10. The non-transitory computer readable medium of claim 7, wherein the function is known to each of the plurality of nodes.

11. The non-transitory computer readable medium of claim 7, further comprising:
receiving, at the first network node, security context information for the plurality of point-to-point tunnels.

12. The non-transitory computer readable medium of claim 11, wherein the security context information includes at least one of: an encryption algorithm to be used, an authentication algorithm to be used, a protocol to be used, and a cryptographic function to be used as the function that generates the plurality of session keys.

13. A network node, comprising:
a hardware platform including a central processing unit (CPU), a memory, and a network interface, the CPU executing code stored in the memory to implement a software platform;

the software platform including a network stack configured to control the network interface and a virtual private network (VPN) manager, the VPN manager configured to: negotiate with a centralized key management server to obtain a master key;

receive a plurality of identifiers that include a first identifier assigned to the network node;

generate session keys by supplying the master key, the first identifier, and another of the plurality of identifiers as parametric input to a function;

establish, using the network stack, point-to-point tunnels through a network to the other network nodes without a key exchange protocol; and send outgoing traffic to the other network nodes through the point-to-point tunnels, the outgoing traffic including portions encrypted by the session keys.

14. The network node of claim 13, wherein the VPN manager is further configured to:
receive incoming traffic from the other network nodes through the point-to-point tunnels, the incoming traffic including an encrypted portions;
decrypting the encrypted portions of the incoming traffic using the session keys.

15. The network node of claim 14, wherein the outgoing traffic and the incoming traffic include packets that have sequence numbers.

16. The network node of claim 13, wherein each of the first identifier and the second identifier is one of a plurality of globally unique identifiers assigned to the plurality of network nodes.

17. The network node of claim 13, wherein the VPN manager is configured to:
receive security context information for the point-to-point tunnels.

18. The network node of claim 17, wherein the security context information includes at least one of: an encryption algorithm to be used, an authentication algorithm to be used, a protocol to be used, and a cryptographic function to be used as the function that generates the session keys.

* * * * *